United States Patent
Katageri et al.

(10) Patent No.: US 12,375,608 B2
(45) Date of Patent: Jul. 29, 2025

(54) ROUTING SYSTEM AND METHOD WITH INTEGRATED DATA SYSTEMS FOR CALL CENTERS

(71) Applicant: ORACLE INTERNATIONAL CORPORATION, Redwood Shores, CA (US)

(72) Inventors: Prateek Pramod Katageri, Bengaluru (IN); Madalasa Venkataraman, Bengaluru (IN); Ramanujan Govindarajan, Bengaluru (IN); Vamsi Krishna Kumbha, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 100 days.

(21) Appl. No.: 18/224,851

(22) Filed: Jul. 21, 2023

(65) Prior Publication Data

US 2025/0030801 A1    Jan. 23, 2025

(51) Int. Cl.
*H04M 3/00* (2024.01)
*G06Q 10/0639* (2023.01)
(Continued)

(52) U.S. Cl.
CPC .... *H04M 3/5233* (2013.01); *G06Q 10/06398* (2013.01); *H04M 3/5175* (2013.01); *H04M 2203/408* (2013.01)

(58) Field of Classification Search
CPC ............. G06Q 10/06398; H04M 3/51; H04M 3/5175; H04M 3/523; H04M 3/5233; H04M 2203/408
See application file for complete search history.

(56) References Cited

U.S. PATENT DOCUMENTS

| 5,036,535 A | 7/1991 | Gechter |
| 6,339,593 B1 * | 1/2002 | Kikinis ................. H04L 65/103 370/352 |

(Continued)

FOREIGN PATENT DOCUMENTS

EP    2338270 A2    6/2011

OTHER PUBLICATIONS

Witness Systems Enhances Contact Center Performance Optimization Suite. Business Wire; Aug. 26, 2003: 5321; pp. 1-6.
(Continued)

*Primary Examiner* — Rasha S Al Aubaidi
(74) *Attorney, Agent, or Firm* — Kragulijac Law Group LLC

(57) ABSTRACT

Systems, methods, and other embodiments associated with an integrated data system that recommends next best agents for call centers are described. In one embodiment, a method includes a customer interaction associated with an issue and a customer ID, querying a unified data source to identify which categories of data are available in response to receiving a customer interaction associated with an issue. The unified data source integrates a plurality of data categories from different data sources. A combination of available data categories is determined and based on the combination of available data categories, selecting and executing a routing algorithm from a plurality of routing algorithms. The executed routing algorithm generates an agent recommendation for the customer interaction and a communication channel is established between a device associated with the recommended agent and the customer interaction to route the customer interaction to the recommended agent.

20 Claims, 7 Drawing Sheets

(51) Int. Cl.
*H04M 3/51* (2006.01)
*H04M 3/523* (2006.01)

(56) References Cited

U.S. PATENT DOCUMENTS

| | | | |
|---|---|---|---|
| 6,424,709 B1 | 7/2002 | Doyle | |
| 6,553,114 B1 | 4/2003 | Fisher et al. | |
| 6,611,590 B1 * | 8/2003 | Lu | H04M 3/51 379/265.09 |
| 6,661,889 B1 | 12/2003 | Flockhart et al. | |
| 7,050,566 B2 | 5/2006 | Becerra et al. | |
| 7,062,031 B2 | 6/2006 | Becerra et al. | |
| 7,263,183 B1 | 8/2007 | Klein | |
| 7,593,521 B2 | 9/2009 | Becerra et al. | |
| 7,885,401 B1 | 2/2011 | Mullen | |
| 8,238,543 B2 | 8/2012 | Shashkov et al. | |
| 8,693,674 B1 | 4/2014 | Darby | |
| 10,097,644 B2 | 10/2018 | Sharpe et al. | |
| 10,445,670 B2 | 10/2019 | Chan et al. | |
| 11,403,571 B2 | 8/2022 | Chan et al. | |
| 2003/0081757 A1 | 5/2003 | Mengshoel et al. | |
| 2006/0062376 A1 | 3/2006 | Pickford | |
| 2007/0038499 A1 | 2/2007 | Margulies | |
| 2008/0077470 A1 | 3/2008 | Yamanaka | |
| 2010/0303225 A1 | 12/2010 | Shashkov et al. | |
| 2011/0069821 A1 | 3/2011 | Korolev et al. | |
| 2012/0278136 A1 | 11/2012 | Flockhart et al. | |
| 2013/0202102 A1 | 8/2013 | Jaiswal | |
| 2014/0140498 A1 | 5/2014 | Mezhibovsky | |
| 2014/0270146 A1 * | 9/2014 | Riahi | H04M 3/4936 379/265.13 |

OTHER PUBLICATIONS

IntelliCenter Makes Information Access Easy. Computer Telephony: S16. CMP Media, Inc. (Mar. 1997) pp. 1-3.

"Analytics Optimized Routing: Working Smarter to Maximize Conversions, Retention and Profits," IBM, received Mar. 27, 2013, retrieved from the internet: ftp://ftp.software.ibm.com/software/au/lotus/pdfs/Analytics_Optimized_Routing.pdf. pp 1-2.

"IBM Real-Time Analytics Matching Platform (RAMP)," IBM, received Mar. 27, 2013, retrieved from the Internet: https://web.archive.org/web/20141016002219/http://www-935.ibm.com/services/us/en/business-services/ibm-real-time-analytics-matching-platform-ramp.html pp. 1-2.

"RAMP: Real-time Analytics Matching Platform: An Analytics Optimized Routing Approach for Inbound Calls," Assurant, Inc., received Mar. 27, 2013, retrieved from the internet: https://web.archive.org/web/*/http://www.assurantsolutions.com/ramp/pdf/RAMP%20onepager.pdf pp. 1.

Best Practices for Implementing Advanced Skills-Based Routing in the Contact Center, Genesys, Mar. 2008, Retrieved from http://www.iconvoicenetworks.com/assets/WHITEPAPER_ALU_Skills-Based_Routing.pdf pp. 1-10.

"New IBM Service Plays Real-Time Matchmaker in Call Centers," Phys.Org, Mar. 18, 2010. Retrieved from http://phys.org/news188153721.html pp. 1-2.

"Precision Routing Documentation", Cisco, Feb. 1, 2013, Retrieved from http://docwiki.cisco.com/wiki/Precision_Routing_Documentation pp. 1-10.

Mehrbod et al., Profile-based Matching of Clients and Agents in Remote Customer Support, Aug. 2020, from Proceedings of the 5th NA Intl. Conference on Industrial Engineering and Operations Management, Detroit, MI, pp. 1-12.

Oracle, What is Customer Data Platform (CDP), Jun. 2023, downloaded from: http://www.oracle.com/cx/customer-data-platform/what-is-cdp/; pp. 1-11.

Oracle, Oracle Customer Experience Unity Cloud Service—Service Descriptions, Oct. 13, 2022, pp. 1-6.

Jerry Gechter; Enterprise Skills Routing: A better solution for todays call center, Telemarketing & Call Center Solutions 15.8: 28,134+. Technology Marketing Corporation (Feb. 1997) pp. 1-4.

Tsily Friedman; Call Center Management: Balancing the Numbers; Industrial Management. Norcross: Jan./Feb. 2001. vol. 43, iss. 1; pp. 1-7.

* cited by examiner

ROUTING SYSTEM AND METHOD WITH INTEGRATED DATA SYSTEMS FOR CALL CENTERS

BACKGROUND

Communication routing systems can be technologically complex due to various factors involved in the computer system configuration and the routing algorithms. In a call center, the routing algorithms attempt to determine the most appropriate agent for each customer that contacts the call center. For example, call centers may handle customer interactions across multiple channels such as phone calls, emails, chat, social media, and more. Routing systems may be able to handle these different interaction channels, and then ensure that customer inquiries are routed/directed to the right agents regardless of the communication channel.

However, many prior call routing systems have been implemented using static methods. These static methods involve handling predetermined conditions with predetermined outcomes such as a preferred language-based routing. For example, the language of a customer determines selection of an agent that speaks the same language. But these static approaches are limited and do not identify the best available agent for a certain issue or for a certain customer. These algorithms did not adapt to changes in data or context of issues.

Other prior call routing systems employed skill-based routing algorithms, where agents are assigned based on their expertise and proficiency in handling specific types of issues. These routing systems attempt to match the customer's issue with the agent's skills. For this, the system may maintain agent profiles and skill matrices. Typically, the routing system selects an agent from the agent profiles based on which agent is currently available (e.g., currently not handling a call). However, the best agent selection in skills-based routing systems is, in practice, limited in accuracy and efficiency because limited data is considered, and assignment decisions are made when a single agent becomes available in the schedule. Schedule availability is by no means the only appropriate criterion by which different agents can be comparatively assessed for assignment. Again, these algorithms did not adapt to different types or sources of data and did not consider context from both the customer side and the organization side.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that provide a routing system and method with an integrated data system, which may be implemented in a call center, for example. A routing system is based on an integrated and unified data platform. The integrated data platform may be created by unifying and/or combining data from multiple independent data sources of an organization, which then makes a wide variety of data relating to customers and agents available for agent recommendations. The routing system is configured to identify, recommend, and assign agents to a customer interaction based on different combinations of data that are available from the integrated data system. In one embodiment, the present system implements an adaptive recommendation algorithm that dynamically adapts its agent routing and recommendation algorithms based on what combinations of data are available for a given customer, for a given issue, and/or historical events associated with the customer.

For example, when the system receives a customer interaction (e.g., phone call or web access) from Customer X and from Customer Y, the system may have data available about Customer X but no additional data about Customer Y. The system is implemented to execute a different algorithm that is configured for the available combination of data in order to identify and recommend an agent for each customer. One algorithm may be executed based on the data available for Customer X and a different algorithm is executed based on the data available for Customer Y. Thus, the present system improves upon prior static methods that handle predetermined conditions with predetermined outcomes (e.g., language-based routing), which do not consider or adapt to other available data, as previously explained.

The data integration of the present system opens a greater opportunity for more sophisticated agent assignment algorithms (which may include a machine learning (ML) based model) that can analyze the integrated data and their parameters for identifying the next best agent to handle an incoming customer request.

In one embodiment, the present system combines and matches data from various data sources/entities (e.g., Sales/service, human resources, customer experiences). When a customer interaction is received (e.g., a request for sales, service, or incident), the present routing model runs a series of data availability checks against the unified/combined data to identify the potential explanatory factors for the particular customer request/incident. Depending on the data availability and the granularity of the data, the routing model selects an optimal recommendation algorithm and path from a number of implemented algorithms to predict the next best agent to be recommended for handling the request/incident. The system may then automatically establish a communication channel between the recommended agent and the customer to connect their devices.

Integrated Routing System Overview

Figure 1:
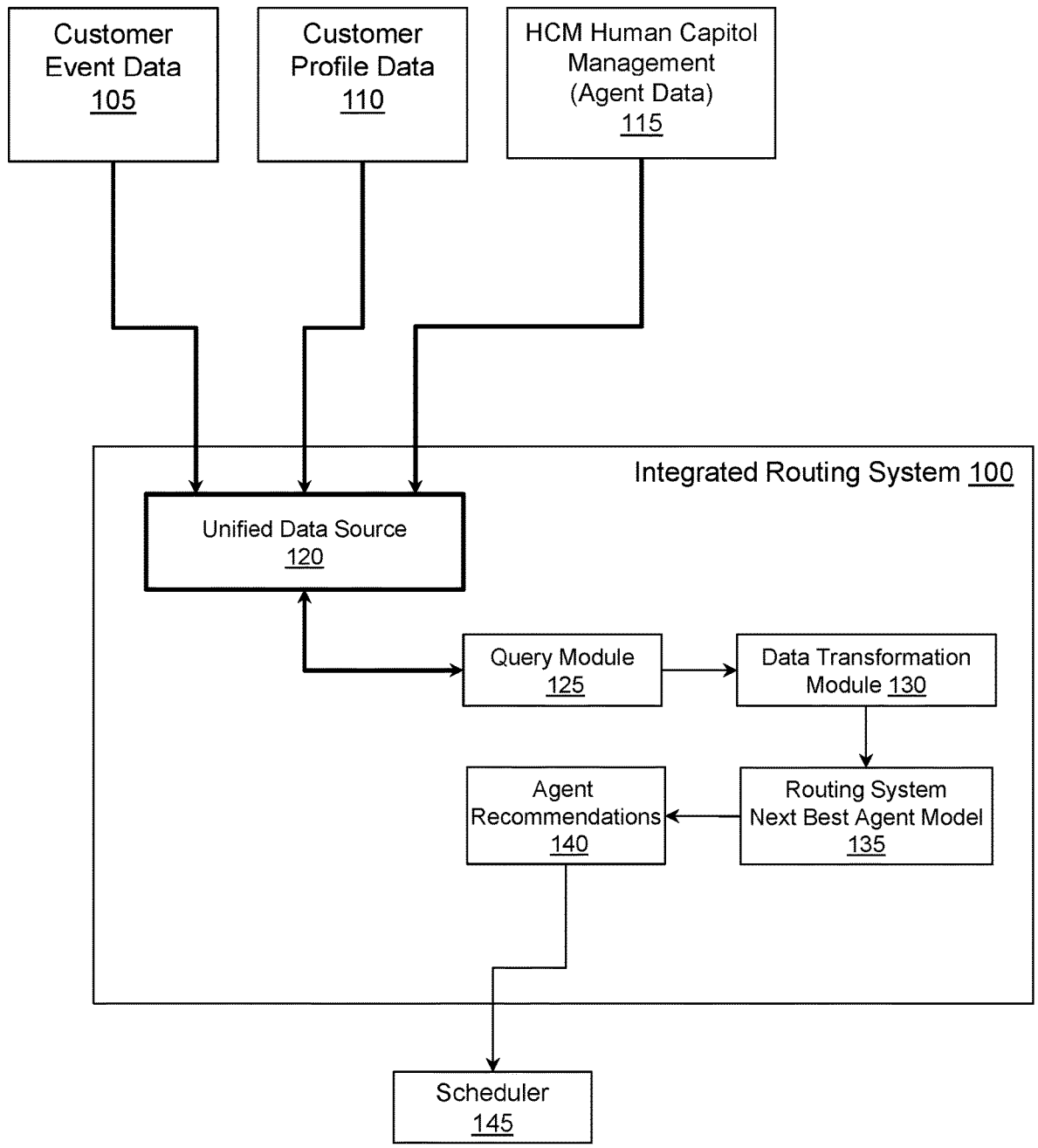
FIG. 1 illustrates one embodiment of a system associated with an integrated routing system that adapts to different combinations of available data and recommends a next best agent.

With reference to FIG. 1, one embodiment of an integrated routing system 100 is illustrated that is associated with identifying, recommending, and assigning agents to customer interactions (e.g., customer phone calls) based on different combinations of data that are available from the integrated system.

In one embodiment, the present routing system 100 integrates data from multiple data systems/sources that may not typically be associated with call routing. For example, the data sources may include, but are not limited to, customer event data 105 (e.g., from a sales/service cloud system), customer profile data 110, and agent data 115 (e.g., from a human capital management (HCM) database). The data from these different sources may be maintained in separate and independent databases for an organization. The data may be pulled in and collected in advance of making routing decisions by using APIs to access and retrieve data from each separate data source/database. Although three data sources are shown, a different number of sources may be used and implemented.

The present routing system 100 integrates data records from the separate databases or sources 105, 110, 115 to create a unified data source 120 (or unified data) that is used for recommending a next best agent. In one embodiment, each different data source 105, 110, 115 represents a different category of data, which is maintained together in the unified data source.

For example, the unified data source 120 may be configured to obtain and store each different category of data (from each different source) in separate data tables in the unified data source 120. Thus, if a particular table is present, then that corresponding category of data is assumed to be present and available. If a particular table is not present or has no data (empty), then that corresponding category of data is assumed not to be available.

It is noted that for any given customer or for any given organization, some of the data or even entire categories of data may not exist and thus is not available in the unified data source 120. As described herein, the routing system 100 is configured to adapt to the type of data categories (type of data sources) that is available and make agent recommendations adaptively based on the available combination of data categories.

For example, a customer's current satisfaction score with the organization, recent marketing campaign exposure and involvement in campaigns, and previous dealings with agents may provide meaningful examples of how the context of a calling customer potentially shifts the identification of who is the best-suited agent to handle the customer and the issue of the customer. These types of parameters were not considered by previous routing systems. If these types of data are available in the system for a calling customer, the routing system 100 considers it in a recommendation.

Thus, the data integration of the present system 100 and the adaptive recommendation algorithm improves upon and creates a more sophisticated agent assignment algorithm. As described herein, the next best agent model is an adaptive algorithm that analyzes the integrated data to determine what data is available and their parameters. Based on the available data, the model adapts, selects, and executes an algorithm that is configured for the type of available data. The selected algorithm then identifies and generates a recommendation for the next best agent to handle an incoming customer request.

With continued reference to FIG. 1, in one embodiment, the present routing system brings together data from at least three different sources/entities covering various data aspects related to agents of the organization, customers, and customer accounts. This data is referred to as the unified data 120 or unified data source. As general descriptions, which are not intended to be limiting, the different data categories from the data sources may be described as follows.

Event Data 105: This data may include data records for logs of all customer interactions by customer ID that have happened in the past with the organization. For example, the data may include the customers that have logged or submitted a service request or incident for a specific product or issue (via phone call, email, web submission, etc.). For each service incident, details are collected about the customer account associated with the incident, a timestamp of the incident, the agent that attended the call, the type of issue for the incident, category and/or product the incident refers to, priority and severity of the issue, the stage/status of the issue, and a resolution or outcome of the issue, etc. In one embodiment, the data records of the customer event data may be identified by at least the customer ID for each of a plurality of customers.

Each incident data record may also include any feedback or rating from the customer for that specific interaction and a rating of the agent that handled the incident. As will be described herein, the agent ratings from the customer event data may be aggregated and used to generate agent rankings for a particular customer and/or for a particular issue. These rankings are used as part of the agent recommendation algorithms.

It is noted that for some incident data records, one or more pieces of information may not have been recorded (for no particular reason) and may be missing. For example, an incident record may not identify the specific agent that handled the incident.

In one embodiment, the event data may also include customer experience data that identifies how a business engages with its customers at every point of their buying journey, from marketing to sales to customer service and everywhere in between. In general, the data may represent information of all interactions a customer has with an organization. The data may include primary information around unified customer profiles (e.g., contacts within accounts) and their engagement trends across online and offline communication mediums. This may help to capture a customer's engagement patterns prior to a sales opportunity or service request.

In one embodiment, the event data may also include customer campaign data such as historical customer engagement in campaigns and level of involvement (e.g., historical customer service data and/or historical sales data) and engagements with the organization such as through marketing campaigns. The engagement data may be recorded over a time period. Information about associated customer accounts, sales agent assigned, opportunity stage, win probability, etc. are previously captured for these events and interactions as they occur.

Unifying and using this type of data by the routing system 100 when a new customer interaction occurs, helps in quantitatively understanding the customer's past experiences and satisfaction rating scores in a particular context and/or with a particular agent in order to recommend the next best agent for the customer interaction.

Customer Profile Data 110: This may be a database of profiles of the customers of the organization. It may include data records for each customer (customer ID) that tracks various parameters specific to a customer, for example, unique customer ID, customer name, type of customer, customer size, account value, purchased products/services/plans, and other customer characteristics or attributes, etc.

Agent Data 115: This may be a database associated with a human capital management (HCM) system pertaining to the agents employed or associated with the organization that are responsible for handling customer interactions (whether service related, or sales related) but may also include employee data from all employees of the organization. Data records for each agent may include agent characteristic data and/or agent attributes representing, for example, agent name, agent ID, title, position, soft and hard skills of the agent and ratings for each skill, subject matter competencies and corresponding ratings, training that the agent has completed, certifications, education level, languages spoken and rating level of each, employment details, real-time availability schedule/calendar, etc. Data for each agent may be input and stored into the database over the course of the agent's employment and/or the data may also be collected and generated from unstructured documents that might be available for each agent using techniques like entity extraction using natural language processing (NLP).

Thus, in one embodiment, the unified data 120 may comprise at least three different categories of data from three different of data sources: (1) customer event data from a first database, (2) customer profile data from a second database and (3) agent data from a third database, which are integrated to create the unified data source 120. As used herein, when referring to "types of data" that are "available," this refers to the different sources of data that are available, or otherwise different categories of data that are available for the next best agent model.

In general, the customer event data 105 may include at least data records representing historical interactions between the organization and a plurality of customers, wherein each customer is assigned a customer ID. The customer profile data 110 may include at least data records representing a customer profile associated with a customer ID that tracks a plurality of parameters about a specific customer including the customer ID, a customer name, a customer type, size of company, contact information, etc. The agent data 115 may include, for each agent from a plurality of agents, data records representing information about a specific agent, for example, agent name, agent ID, title, experience levels in subjects, skill levels, interactions involving particular issues with particular customer IDs, employment information, etc.

In one embodiment, the agent data 115 may also include scores or ratings for each agent based on outcomes of each interaction. This may include, but not limited to, scores for handling each different issue, scores for handling issues from each different customer, and/or aggregated scores for different customers and/or types of issues. In one embodiment, the agent scores may then be used to generate rankings of agents based on types of issues, based on customers, and/or based on a combination of issues and customers. For example, when a customer interaction is received, the recommendation system may generate in real-time rankings of agents based on the calling customer, the type of issue, and/or both customer and issue type.

As previously explained, for a given customer ID, one or more of the at least three types/categories of data may be missing from the unified data 120. Thus, at a time when the system is handling a customer interaction and attempting to recommend the next best agent, some data may be available and some data may not be available. As will be described, the types of available data (e.g., the combination of available data) is used as a basis to control and adapt the next best agent model. In one embodiment, the next best agent algorithm includes a plurality of algorithms where each algorithm is associated with and configured for a different combination of available data in order to assign the next best agent for a given customer interaction.

Routing and Recommendation Overview

With continued reference to FIG. 1, in one embodiment, the integrated routing system 100 may process a customer interaction in real-time with components that include, but are not limited to, the following modules. A query module 125 may be configured to execute a series of data availability checks against the unified data 120 to identify what types/categories of data are available for in the system and/or for a given customer ID. The results of the queries are used to determine what combination of available data is present. A data transformation module 130 may be configured to extract and process selected portions of the available data that is retrieved from the query module 125 into a unified format.

A next best agent model 135 is configured to identify and generate a recommendation 140 of a next best agent(s) (based on the available data) to be assigned to the customer interaction. The next best agent model 135 is configured with multiple different recommendation/routing algorithms to handle different combinations of available data. Based on the combination of available data, a particular algorithm is selected and executed.

As described with reference to FIGS. 2-6, each different recommendation/routing algorithm is configured as a different hierarchical algorithm that uses the combination of available data in different hierarchical levels based on what combination of available data is present. In other words, when the combination of available data changes, the types and amounts of available data changes. Each different recommendation/routing algorithm is configured to handle a different level and amount of data thus making each recommendation/routing algorithm adapt to the hierarchical level of the available data.

A scheduler module 145 may be configured to coordinate the real-time schedule of the recommended agent(s) and determine current availability of each and/or predict when the recommended agent(s) will become available in the near future based on, for example, their current workflow and call status. In one embodiment, two or more of the modules may be configured as one routing module.

Module Embodiments

In one embodiment, the query module 125 may be configured to query the unified data 120 to identify which of the three types/categories of data are available. For a given customer interaction (e.g., a customer call is received), a customer ID may be determined from identifying the customer name and retrieving the customer ID from a database of assigned IDs to customer names, if present. The query module 125 may generate a number of queries based on the number of integrated data categories from the different data sources.

In the present example, there are three data types/categories integrated, namely, the customer event data 105, the customer profile data 110, and the agent data 115. Thus, three queries may be generated and submitted to the unified data source 120 to determine whether the particular data category is present. One query may also be generated that includes three different sub-queries for the different data categories. Of course, there are many different ways to generate queries and different amounts of data categories than three.

In another embodiment, the unified data source 120 may be configured to specifically respond to a data availability query and indicate which categories of data are present and available. For example, the data availability query may be a specifically defined query for this purpose. A query response may simply indicate which data categories are available, without having to analyze data at a data record level (e.g., column and row data in tables). The unified data source 120 is created and built from a defined set of data categories from a defined and known set of data sources (e.g., 105, 110, 115, etc.) that are selected for integration. Thus, the unified data source 120 knows which of the data sources were used to create data tables and contain data from each different data category. As such, the query response can provide a direct indication of what combination of data is available.

To generate and process a query, in one embodiment, the computer of the integrated routing system 100 establishes a network connection to the unified data source 120. This connection allows the query module 125 to send queries and receive responses.

In one embodiment, the query module 125 constructs a query using a database query language such as SQL (Structured Query Language) or another language that is recognized by the unified data source 120. The query is designed to retrieve information from the database of the unified data source 120 that can help determine the availability of the desired data from the different data categories.

In one embodiment, the query may be configured to request whether or not a particular category of data is present in the unified data source 120. For example, the query may ask whether the customer event data is present, whether the customer profile data is present, and whether the agent data is present. In one embodiment, a response to each query may be "yes" or "no." In one embodiment, each different category of data (e.g., 105, 110, 115) may be configured and stored in separate data tables in the unified data source 120. If a particular table is present, then that corresponding category of data is assumed to be present. If a particular table is not present or is empty, then the corresponding category of data is not available.

In another embodiment, the query may include specific conditions to filter the data. For example, this may include specifying the customer ID of the customer interaction to retrieve data records associated with that customer ID that may exist in the customer event data and in the customer profile data. A query for available agent data may specify agents that have been associated with the customer ID and/or associated with the type of issue of the customer interaction. The one or more queries are transmitted to the unified data source 120, which processes the one or more queries, searches its tables for matching data, and returns query results.

The query results are analyzed to determine if the requested data is available or not. Based on the results received from the unified data source 120, the query module 125 determines what combination of data is available. Accordingly, the types/categories of data that are not returned by the queries indicate the types/categories of data that are missing (not present) in the unified data source 120. For example, if no results are returned from the customer profile data, then customer profile data is not available. If results are returned from the customer event data and the agent data, then that combination of data is available.

Also, for any given customer ID, the unified data source 120 may include varying amounts of data records and varying degrees of data granularity. Different organizations record different types and amounts of data for customers. Long standing customers may have large amounts of customer event data while a new customer may have no event data (no data available).

Based on the query results, the routing system 100 can determine what combination of data is available. In the above example, the combination of available data is the event data and the agent data. As understood by those of ordinary skill in the art, the specific implementation details of querying can vary depending on the database system and programming language being used.

The retrieved available data is then transmitted to the data transformation module 130.

In one embodiment, the data transformation module 130 may be configured to transform the available data into feature vectors that become input to a machine learning (ML) model. The ML model may be part of the next best agent model 135 and configured to identify and generate a recommended next best agent. The ML model is described further in the ML model embodiment below.

In another embodiment, the data transformation module 130 may be configured to process the available data that is retrieved from the query module 125. For example, the data transformation module 130 may convert the collected data into a unified format. This makes it easier for the system to implement and perform functions on the data since there are not multiple formats. The collected data comes from different data sources and has different types of data records, different data organizations, and thus has different formats. Multiple formats make any data analysis very complex since the analysis modules need to be specifically programmed in multiple ways for the multiple formats. This problem is eliminated by the present system by creating a unified format.

Transforming or otherwise converting the collected data into a unified format may include extracting particular data fields that are relevant to the next best agent recommendation model 135. What is relevant may include, but is not limited to, the types of data described herein. The data transformation model 130 may also be configured to generate rankings of agents based on their scores as associated with the customer ID, the type of issue the customer is calling about, and/or both, if such data is available from the unified data 120. The combination of available data is then transmitted to the next best agent model 135, which will be described with reference to FIG. 2.

Next Best Agent Model and Process Embodiment

Figure 2:
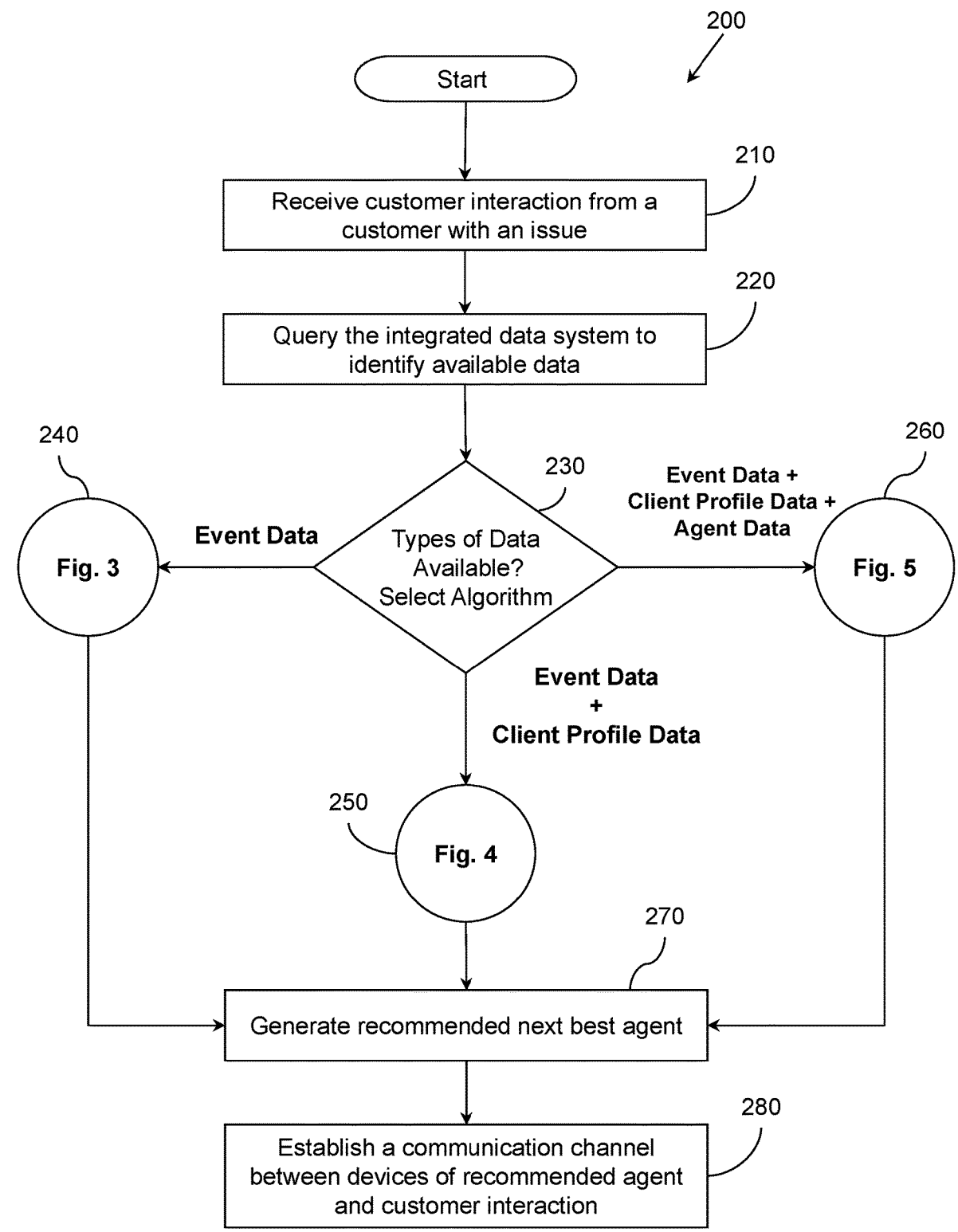
FIG. 2 illustrates another embodiment of a method associated with an integrated routing system that adapts to different combinations of available data and recommends a next best agent.

With reference to FIG. 2, in one embodiment, a next best agent recommendation method 200 is illustrated that is associated with identifying, recommending, and assigning next best agents to customer interactions (e.g., customer phone calls) in real-time based on different combinations of data that are available from the integrated data system. Method 200 may be implemented by the integrated routing system 100 shown in FIG. 1, which includes the unified data source 120 and the next best agent model 135 shown in FIG. 1.

In one embodiment, at block 210, method 200 may be initiated by the system in response to receiving a customer interaction from a customer. The customer interaction may be received via any one of multiple communication channels, for example, phone calls, emails, chat, social media, or other channel. The following example will be described with reference to a customer phone call but the next best agent recommendation algorithms apply to any of the communication channels to recommend an agent.

Any information related to the customer phone call may be obtained via verbal responses from the customer and/or electronic input. This information may include the customer name and reason for calling (an issue/problem the customer is having). A customer ID may then be identified for the customer name if the customer is a previous customer (existing customer in the system) or may be given a new customer ID if the customer is new to the system.

At block 220, the integrated data system (e.g., the unified data source) is queried to identify which of the data categories are available and/or are available based on at least the customer ID. If there are three categories of data that have been integrated as shown in FIG. 1, then one or more queries maybe generated to request data from the known categories of data. This has been previously described with reference to the query module 125.

In one embodiment, each of the at least three categories of data may be stored and organized in separate data tables in the unified data source. The integrated data system may be configured to respond to a query requesting to identify which of the at least three categories of data are available by at least identifying whether each of the data tables is present in the unified data source. For example, if a data table corresponding to the event data 105 is present, then event data is available. A query response may then indicate the combination of available data based on the identifying function.

At block 230, the types/categories of data available in the unified data source are determined from the query results. This determines what combination of available data exists based at least on the customer ID. The combination of available data is sent to the next best agent model 135. Based on the combination of available data, a particular routing algorithm is selected and executed from a plurality of routing algorithms. The selected routing algorithm is an algorithm that is configured to generate a recommended agent from a plurality of agents for the customer interaction based on the combination of available data.

In this regard, the next best agent model 135 is configured with a plurality of routing algorithms. Each different routing algorithm from the plurality of routing algorithms is configured to handle a different combination of the available categories of data. Based on the combination of available data, the next best agent model 135 adapts to the combination and executes a different algorithm in order to consider the data that is available and make a recommendation for the next best agent based on the data that is available.

Figure 3:
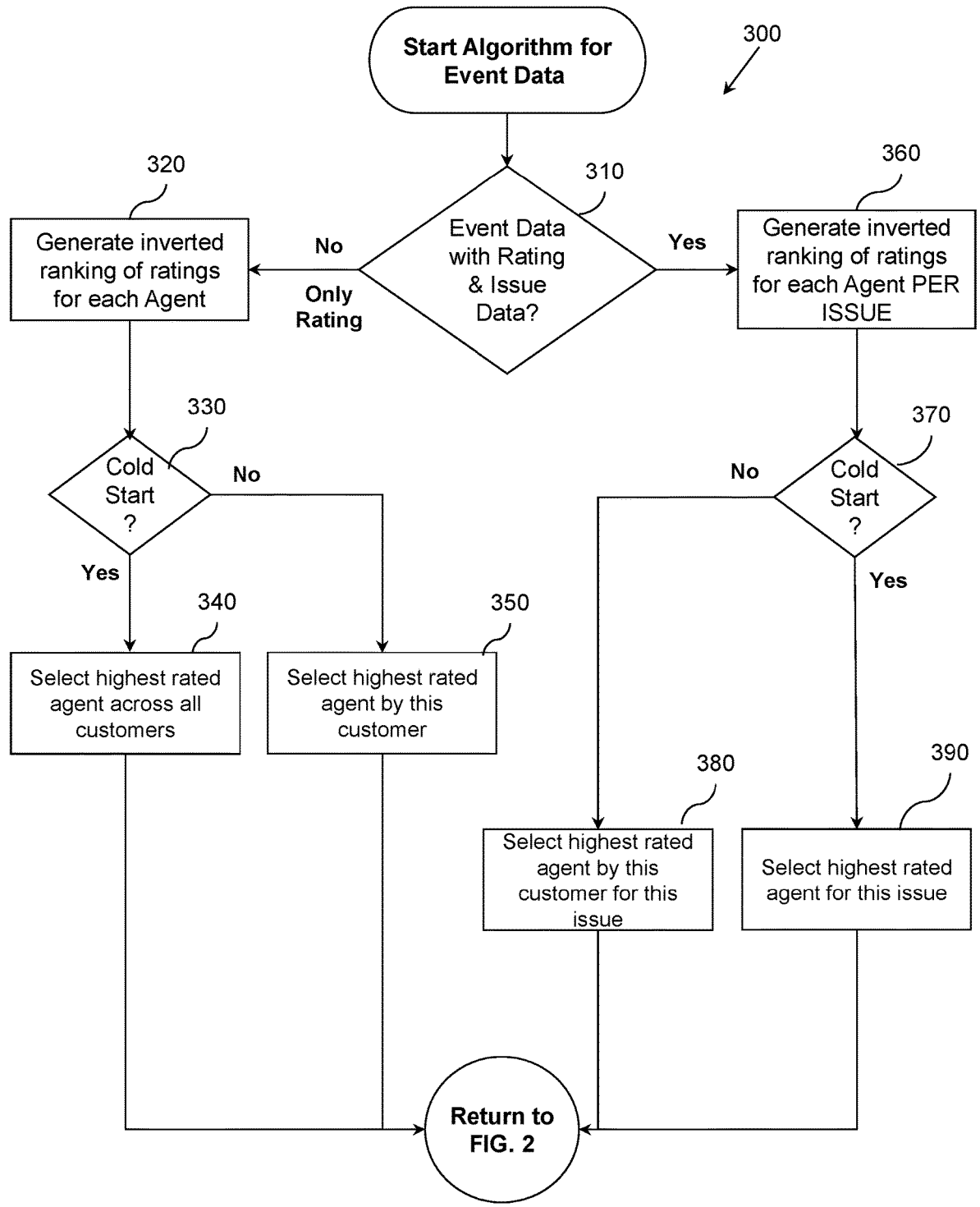
FIG. 3 illustrates one embodiment of a method associated with a first algorithm for generating a next best agent recommendation based on event data.
Figure 4:
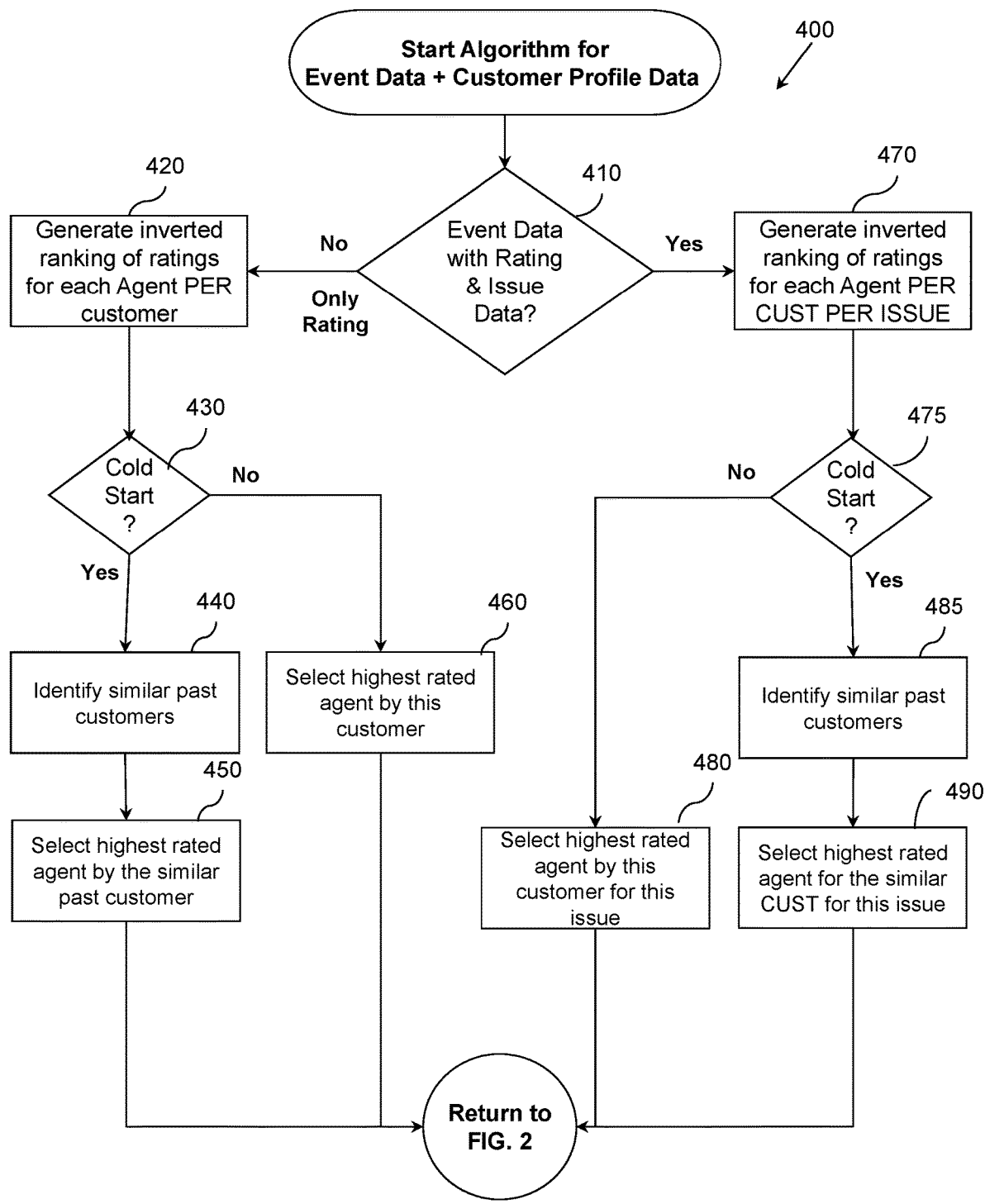
FIG. 4 illustrates one embodiment of a method associated with a second algorithm for generating a next best agent recommendation based on event data and customer profile data.
Figure 5:
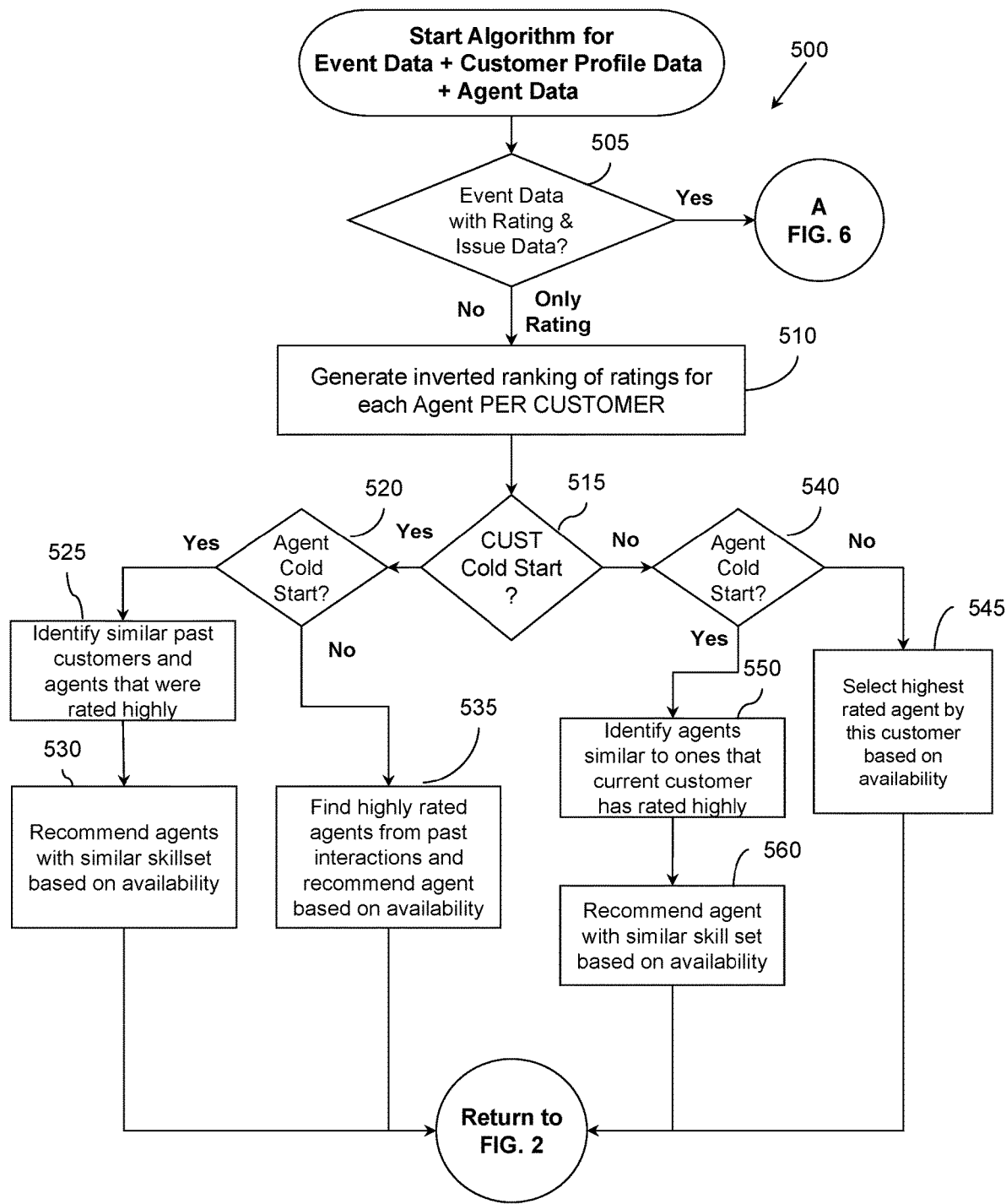
FIGS. 5 and 6 illustrate one embodiment of a method associated with a third algorithm for generating a next best agent recommendation based on event data, customer profile data, and agent data.

For example, if event data is available and none of the other types, then a first algorithm is selected and processing flows to connector block 240, which is shown in FIG. 3. If event data and client profile data is available, then a second algorithm is selected and processing flows to connector block 250, which is shown in FIG. 4. If event data, client profile data, and agent data is available (e.g., all three types/categories), then a third algorithm is selected and processing flows to connector block 260, which is shown in FIG. 5.

The different algorithms are configured as different hierarchical algorithms that use the combination of available data in different hierarchical levels based on what combination of available data is present. In one embodiment, the first routing algorithm (FIG. 3) is configured to generate the agent recommendation based on the customer event data being available without relying on the other categories of data. The second routing algorithm (FIG. 4) is configured to generate the agent recommendation based on a combination of the customer event data and the customer profile data being available. The third routing algorithm (FIGS. 5-6) is configured to generate the agent recommendation based on a combination of the customer event data, the customer profile data, and the agent data being available.

After the selected algorithm is executed, at block 270, a recommended agent(s) is identified from the plurality of agents and an output is generated representing the recommended agent(s). The generated output may be in different forms such as an electronic message, a display on a user interface screen, an electronic signal that identifies the recommended agent, etc. and may identify the agent by an agent ID and/or by name.

In one embodiment, the recommended agent(s) is transmitted to a scheduler (e.g., scheduler module 145 shown in FIG. 1). The scheduler may be configured to access real-time schedule information for the recommended agent(s) and determine the real-time availability of the agent(s). If the recommended agent is available, the process flows to block 280. If the recommended agent is not available, the system may wait for a time period until the agent is available, or may select a second best recommended agent that is currently available.

At block 280, the system establishes a communication channel between a device associated with the recommended agent and the customer interaction to route the customer interaction to the recommended agent. This allows the recommend agent to handle the customer interaction and communicate with the customer.

In one embodiment of block 270 (which is part of the next-best-agent (NBA) model 135) may be implemented with a machine learning (ML) model. This is further explained in the machine learning embodiment below.

In one embodiment, the next-best-agent (NBA) model 135 is configured to resolve the question of how agent suitability can be determined in a data driven way. The model 135 may be implemented with machine learning (ML). The model seeks to establish a statistical significance of various agent and customer related factors in predicting a recommended agent by considering the recommendation as a multivariate problem with unbiased weighting assigned to potential explanatory factors.

In another embodiment, with reference to the data availability decision block 230, the next best agent (NBA) model 135 is configured to adapt to the combination of available data as follows. Depending on the availability of the data and the granularity at which the data records are captured, the NBA model 135 selects and executes an optimal algorithm and thus optimal flow to predict the next best agent to be recommended.

For example, if only Event Data is available (block 240) out of the three categories, then the selected algorithm generates a rating matrix of agents that are found in the event data. The rating matrix of agents is based on previous feedback and rating scores. The algorithm also considers whether the customer interaction is a cold start situation (e.g., a first-time customer to the organization) or a previously encountered situation (e.g., pre-existing customer).

The next best agent is picked based on historic client feedback and issue type for interactions, if found in the event records.

If the Event Data is present as well as the Client Profile Data (block 250), then selected algorithm looks at the similarities derived from the client profile database and recommends client cases similar to the ones encountered earlier, best agents based on the feedback from similar clients in the past. This helps in dealing better with a client-side cold start problem where previous interaction for new clients is unavailable and straight forward recommendations cannot be made.

If the Event Data is present as well as the Client Profile Data and Agent Data (block 260), then the selected algorithm is configured to use this additional knowledge about the agents from the agent data to help find agents similar to any highly rated agents from previous client encounters. Here, the model is able to effectively deal with cold start conditions (a first-time customer) at the agent side, as recommendation of similar agents to the ones that have been rated highly with specific types of clients is possible and given this similarity information across both the ends, enable best possible recommendations for the new case that gets logged.

This process may be further adjusted to take into consideration specific constraints, such as work shifts and schedules of the agents and/or the communication channel through which the call/issue is raised. This may further enhance the recommendations output by the next best agent algorithm, which may lead to higher and quicker customer satisfaction by using intelligence available from the historical data.

Event Data Algorithm

With reference to FIG. 3, one embodiment of method 300 is illustrated that is associated with generating a recommended next best agent based on having customer event data available and none of the other data sources (e.g., customer profile data and agent data). When only customer event data is available in the system, the next best agent model is configured to select and execute an event data algorithm, which is configured to generate a recommendation based on the customer event data without relying on data from the other data sources.

As previously explained, the customer event data may include previous historical event data about interactions with a plurality of customers, which may or may not include previous incident data from the current customer who is calling. The event data may include data records of all historical customer interactions and incidents by customer ID and/or customer name that have happened in the past with the organization. Each interaction data record may identify the type of issue for the interaction, but the issue type may not always be captured in the data record. The historical interactions may also include data that identifies an agent that handled each interaction and a rating score representing how each interaction was resolved for that customer and/or the customer's satisfaction with the agent.

Recall that method 300 comes from FIG. 2 where the system has previously determined the customer ID from the customer interaction and the issue type that represents the issue or problem that the customer is calling about.

At block 310, the system may parse and analyze the event data to determine whether the data includes data records with customer ratings given to events/incidents (which may apply to the agent that handled the incident), agent ratings given by customers for incidents, and issue data that identifies issue types associated with previous incidents. From the event data records, a set of agents involved in the events/incidents may be identified. As previously described, the event data includes data records related to interactions from a plurality of customers. If there is no previous data from incidents that have the same issue type from the current call interaction, decision block 310 moves to block 320.

At block 320, the system generates an inverted ranking of ratings for each agent from the historical event data from interacting with the plurality of customers. Since there is no previous data with the same issue, the ranking does not consider the agent ratings based on the issue type. For example, this may include parsing the customer event data, identifying incidents and identifying each customer and agent involved (if the agent is identified in the record). The algorithm may also search for and extract any customer and/or agent ratings/scores that are associated with each incident. The ratings may then be compiled for each agent per customer.

At block 330, the algorithm determines whether the customer interaction is a cold start or not. A cold start means that the calling customer is a new customer to the system (e.g., a first-time customer). For example, the calling customer has an associated customer name or customer ID. After parsing the event data records, if the customer name or customer ID is not found in any of the historical event data, then the calling customer is designated as a new customer (cold start=YES). If the customer name or customer ID is found in any of the historical event data, then the calling customer is designated as an existing customer (cold start=NO).

The next best agent algorithm is configured to make its recommendation differently based on the customer cold start status, which may adjust the ultimate recommendation for who is the next best agent. In one embodiment, the other routing/recommendation algorithms herein include this type of cold start determination, which causes a different process to execute. For example, in one embodiment, in response to the calling customer being a first-time customer, that algorithm is configured to generate the recommended agent based on any available agents that are highly rated by other customers. In response to the calling customer being the existing customer, the algorithm is configured to generate the recommended agent based on available agents that were previously highly rated by the calling customer.

At block 340, if the calling customer is new (cold start 330=YES), then the event data has no previous interactions with the calling customer. This means there is no data indicating that any particular agents have worked with the calling customer in the past. Thus, the algorithm is configured to select the highest rated agent across all customers since there is no particular agent ratings made by the specific calling customer. For example, the recommended agent will be selected from any of the highest rated agents that was rated by other customers and who is currently available.

If the calling customer is not new but an existing customer (cold start=NO), then at block 350, the system selects the highest rated agent by this calling customer. For example, the recommended agent will be an agent that was previously involved with the calling customer since the calling customer had a good experience with its previously highly rated agents. Other agents that may be higher rated by other customers but have not interacted with the calling customer are not first considered. The method then returns the recommended agent to the process of FIG. 2 Block 270.

Returning to decision block 310, if there are data records in the event data that include customer ratings for incidents, agent ratings for incidents, and/or incidents with the same or similar issue as in the current issue by the calling customer, the method moves to block 360. The algorithm uses this additional available level of data as part of its hierarchical implementation.

At block 360, the algorithm generates a ranking of ratings for each agent identified and ranks them per issue. The ratings for each agent per issue are extracted from the event data and summed/averaged for each agent or adjusted by a scoring algorithm. The generated ranking may be a list ordered from best ratings to worst ratings to create an inverted ranking. Other forms of the ranking may also be generated such as filtering and removing agents whose ratings do not meet a defined threshold rating. The remaining agents are those with the highest set of ratings. This functionality may also apply to the other algorithms that generate an inverted ranking as described below.

In one embodiment, the ratings for each agent in the set of agents may be ranked for each issue type associated with previous incidents involving the same or similar product/service as the product/service that the customer is calling about (e.g., ranking based on product/service context). In an organizational setup of a company, the clients can raise incidents regarding multiple products and each product may have a specific team of agents for their product support. Thus, within a specific product/service context, the best agent would be assigned an incident from the clients using that specific product or service.

For example, regarding the products context, the configuration of context data may be in a hierarchical form as follows. Service requests are embedded with a product or service. A service request for a dryer, for instance, may be embedded with hierarchical data such as:

XYZ brand dryer>product washing machines and dryers>consumer durables. (this could be from a funding/leasing query or issue).

At the same time, the context could also be:

XYZ brand dryer>XYZ brand washers and dryers>XYZ brand (this could be from a brand warranty policy query or issue).

Or XYZ brand dryer>washers and dryers>washer and dryer parts (this could be from a repair query or issue).

The request here is to consider an agent's familiarity with the product or service (along the hierarchy of product or service knowledge) so an agent with information on XYZ dryer is hierarchical within the XYZ brand as well as consumer durables based on the type of query, keywords etc. This hierarchical knowledge may be considered when ranking agents for the issue of the calling customer. The hierarchical knowledge and ranking of agents may also be implemented in the other embodiments described herein.

At block 370, the algorithm determines whether the calling customer is a cold start or not similar to block 330. If the calling customer is not new but an existing customer (NO cold start), then at block 380 the algorithm selects the highest rated agent by this customer and for the present issue. If the calling customer is new (YES cold start), then at block 340, the algorithm selects the highest rated agent for this issue from all other customers since there is no previous customer data for the specific call customer. The method then returns the recommended agent to the process of FIG. 2 Block 270.

With reference to FIG. 4, one embodiment of method 400 is illustrated that is associated with generating a recommended next best agent based on having customer event data and customer profile data available. Thus, the combination of available data is event data plus customer profile data. When this combination of data is available in the system, the next best agent model is configured to select and execute a second algorithm, which is configured to generate a recommendation based on the event data and customer profile data.

At block 410, the algorithm makes a similar decision as in block 310 of FIG. 3. The algorithm may parse and analyze the event data to determine whether the data includes agent ratings and issue data that identifies the types of issues from previous incidents that have been captured from a plurality of customers. If there is no previous data from incidents that have the same issue type from the current call interaction, decision block 410 moves to block 420.

At block 420, when there is no issue data, the algorithm generates an inverted ranking of ratings for each agent from the historical event data from interacting with the plurality of customers per each customer. Here, the customer profile data provides additional data about the plurality of customers that are recorded in the system. Thus, the rankings are generated and sorted per customer. However, since there is no previous data with the same issue, the ranking does not consider the agent ratings based on the issue type.

At block 430, the algorithm determines whether the customer interaction is a cold start or not (new customer or pre-existing customer). If the calling customer is new (YES cold start), then at block 440, the algorithm analyses the customer profile data to identify similar past customers that have similar attributes and/or characteristics as the calling customer.

At block 450, the algorithm then selects the highest rated agent that is associated with the customer(s) that is most similar to the calling customer from the inverted rankings that correspond to the similar customer.

If the calling customer is not new but an existing customer (NO cold start at block 430), then at block 350, the algorithm selects the highest rated agent that corresponds to the calling customer. The method then returns the recommended agent to the process of FIG. 2 Block 270.

Returning to decision block 410, if there is rating and issue data present for the current issue, at block 470, algorithm generates an inverted ranking of ratings for each agent per customer per issue.

At block 475, the algorithm determines whether the calling customer is a cold start or not similar to block 430. If the calling customer is not new but an existing customer (NO cold start), then at block 480, the algorithm selects the highest rated agent by this customer and for the present issue.

If the calling customer is new (YES cold start at block 475), then at block 485, the algorithm analyses the customer profile data to identify similar past customers that have similar attributes and/or characteristics as the calling customer.

At block 490, the algorithm then selects the highest rated agent that is associated with the customer that is most similar to the calling customer from the inverted rankings that correspond to the similar customer and based on the same issue. The method then returns the recommended agent to the process of FIG. 2 Block 270.

With reference to FIG. 5, one embodiment of method 500 is illustrated that is associated with generating a recommended next best agent for a customer interaction based on having customer event data, customer profile data, and agent data available. Thus, the combination of available data includes all three data types from the unified data source 120 (FIG. 1): event data plus customer profile data plus agent data. When this combination of data is available in the system, the next best agent model is configured to select and execute a third algorithm, which is configured to generate a recommendation based on the three data types as shown in FIG. 5 and connecting to FIG. 6.

It is noted that the customer profile data may include profiles of many different customers that are maintained by the system. However, the current calling customer may not have its own customer profile in the profile data.

The algorithm and method 500 is initiated by the next best agent model at decision block 230 (from FIG. 2) in response to determining that the three categories of data are available.

At block 505, the algorithm makes a similar decision as in block 310 (FIG. 3) and block 410 (FIG. 4) to determine if the historical customer event data includes rating and issue data. The algorithm may parse and analyze the event data to determine whether the data includes agent ratings and issue data that identifies the types of issues from previous incidents that have been captured from a plurality of customers.

Figure 6:
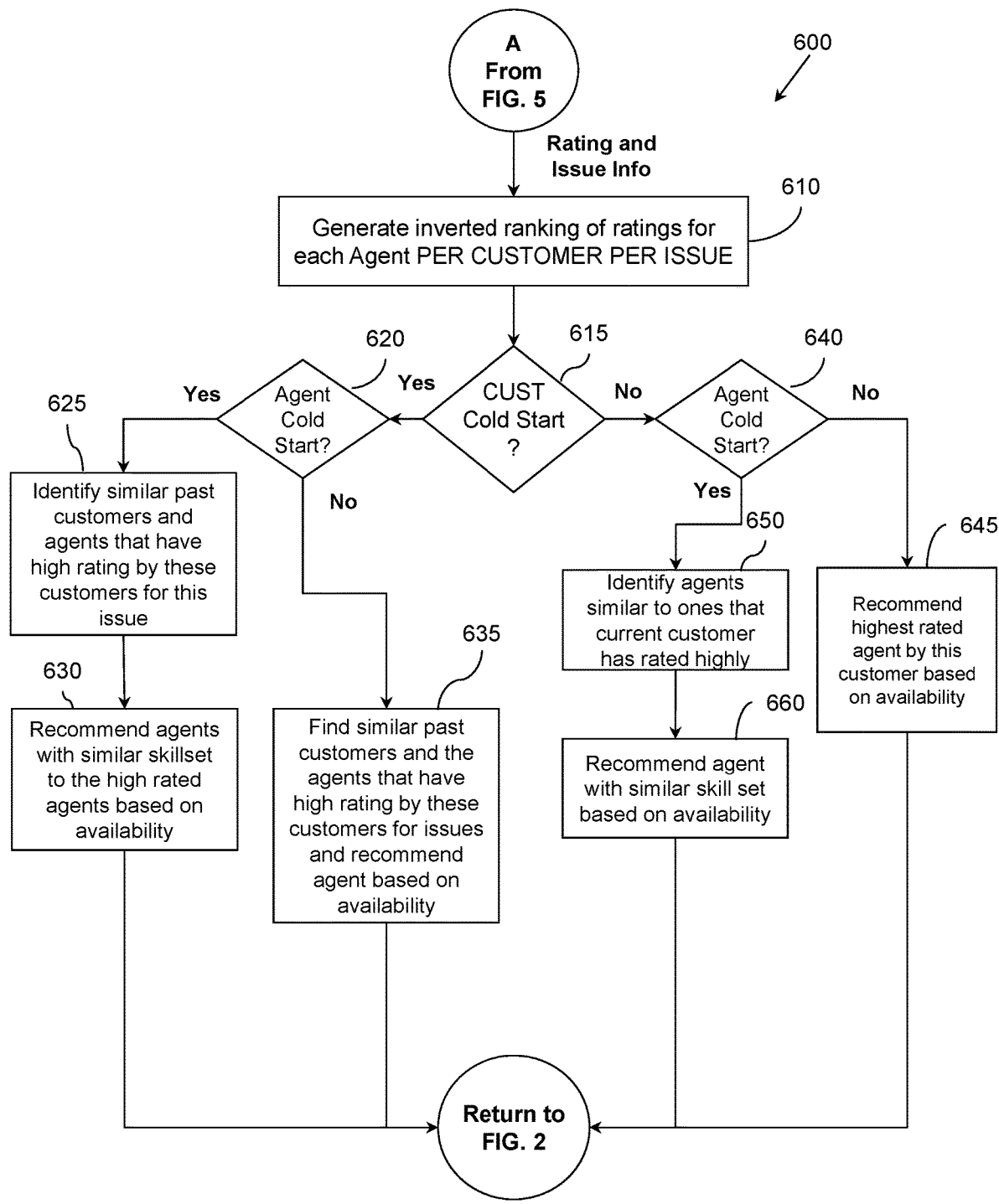

If there is previous data from incidents that have ratings and the same issue type as in the current call interaction, decision block 505 moves to connector A, where the algorithm flow goes to FIG. 6. FIG. 6 is described below. If there is only rating information and no previous data from incidents that have the same issue type as in the current call interaction, decision block 505 moves to block 510.

At block 510, the algorithm generates an inverted ranking list of ratings for each agent per customer. Each different customer (customer ID) is found from the customer profile data. For example, this may include parsing the customer event data identifying incidents and identifying each agent involved, extracting and compiling ratings for each agent per customer.

At block 515, the algorithm decides whether the current customer interaction involves a customer cold start or not. As previously explained, a new customer (first-time customer) to the organization does not have an existing customer profile data. However, there may be circumstances where a customer has previously interacted with the organization and thus the customer has historical event data records contained in the system. But, for whatever reason, a customer profile was not created or stored for that customer when the customer previously interacted with the system or organization.

Thus, event data exists for the calling customer but there is no corresponding customer profile, which then makes this a cold start customer at decision block 515. The algorithm considers the status of the calling customer (whether new or existing) as part of the recommendation algorithm and the status may shift or change who the recommended agent is in the result.

Whether the calling customer is a cold start customer or not, the method 500 makes an additional determination about whether this is an agent cold start situation or not at decision block 520 and block 540. This additional determination is performed in this algorithm of method 500 because the agent data was available from the unified data source 120 as part of the combination of available data. This determination is not performed by the previous algorithms because the agent data is not available in those situations.

At decision block 520, the algorithm determines whether this is an agent cold start situation. For example, the historical customer event data is scanned and parsed to identify previous interactions of the calling customer, and to identify any agents that handled those interactions for this customer. However, there may have been no recorded data about the agent that was involved.

When no such agent information is found in the event data, then decision block 520 is "YES" meaning that it is an agent cold start and the method moves to block 525. In other words, an agent cold start means that the calling customer has had no previous interactions or experiences with any particular agent from the organization.

When agent data is found for previous interactions with the calling customer, then decision block 520 is "NO" meaning that it is not an agent cold start and the method moves to block 535. In other words, if this is not an agent cold start, it means that the calling customer has had previous experience with one or more agents within the organization. As a result, the algorithm will attempt to match and recommend one of these previous agents to the calling customer as the recommended agent. Thus the algorithm will most likely recommend an agent that the calling customer has previously delt with rather than recommending a brand new agent that the calling customer has not previously delt with. For example, at block 535, the algorithm finds and identifies highly rated agents from past interactions with the calling customer and recommends the highest rated agent based on the agent's availability to handle the current calling customer.

At block 525, since the calling customer has had no previous interactions with any specific agent, the algorithm identifies similar past customers and the agents that were highly rated by those similar customers. These are identified from the previously generated rankings of ratings at block 510.

At block 530, from the identified agents from block 525, the algorithm recommends agents with a similar skill set based on the agent's current availability.

The method ends and returns the recommended agent to the process of FIG. 2 Block 270.

Returning to decision block 515, if the calling customer has a customer profile in the customer profile data (not a cold start), The algorithm goes to decision block 540 to decide whether this is an agent cold start situation similar to decision block 520.

In response to having information that one or more agents previously interacted with the calling customer (agent cold start=NO), the algorithm moves to block 545. At block 545, the algorithm selects (from the inverted rankings) the highest rated agent by this customer based on the agent's availability. For example, from all the agents that previously interacted with this calling customer and were previously rated by this calling customer (which is found from the event data), the highest rated agent is selected as the recommended agent who is currently available.

The method ends and returns the recommended agent to the process of FIG. 2 Block 270.

Returning to decision block 540 (agent cold start?), if the system determines the calling customer has had no previous interactions with any specific agent (similar to block 520), then Agent Cold Start=YES and the flow moves to block 550.

At block 550, the algorithm identifies agents similar to ones that the current customer has rated highly. These are identified from the previously generated inverted ranking of ratings at block 510 and based on agent characteristics from the agent data.

At block 560, the algorithm recommends the agent with a similar skill set based on the agent's current availability.

The method ends and returns the recommended agent to the process of FIG. 2 Block 270. The algorithm is further described with reference to FIG. 6.

With reference to FIG. 6, one embodiment of method 600 is illustrated that is associated with the algorithm of method 500 (from FIG. 5). Method 600 is initiated from decision block 505 from FIG. 5 when the system determines that the historical event data includes both ratings and issue data relating to types of issue involved in the event data.

At block 610, the algorithm generates an inverted ranking list of ratings for each agent per customer and per issue type. Each different customer (customer ID) found from the event data records may be matched to the customer profile data to find a corresponding customer profile. For example, this may include parsing the customer event data, identifying incidents and identifying each customer and agent involved (if the agent is identified in the record). The algorithm may also search for and extract any customer and/or agent ratings/scores that are associated with each incident. The ratings may then be compiled for each agent per customer per issue type.

The algorithm executes a similar set of "cold start" decision blocks as in FIG. 5 (blocks 515, 520, and 540). These include decision block 615 (customer cold start?), block 620 (agent cold start?) and block 640 (agent cold start?). These descriptions are not repeated here.

In the conditions were customer cold start=YES (block 615) and agent cold start=YES (block 620), the method moves to block 625. In other words, an agent cold start means that the calling customer has had no previous interactions or experiences with any particular agent from the organization. At block 625, the algorithm identifies similar past customers and agents that have high ratings by these similar customers for this issue. The identification uses the rankings that were generated in block 610.

At block 630, from the identified agents from block 625, the algorithm recommends agents with a similar skill set to the high rated agents based on the agent's current availability.

The method ends and returns the recommended agent to the process of FIG. 2 Block 270.

Returning to decision block 620, when agent data is found for previous interactions with the calling customer, then decision block 620 is "NO" meaning that it is not an agent cold start and the method moves to block 635.

At block 635, since this is not an agent cold start, it means that the calling customer has had previous experience with one or more agents within the organization. As a result, the algorithm will attempt to match and recommend one of these previous agents to the calling customer as the recommended agent rather than a new agent. Thus, the algorithm will most likely recommend an agent that the calling customer has previously delt with rather than recommending a brand new agent that the calling customer has not previously delt with. For example, at block 635, the algorithm finds and identifies similar past customers and the agents that have high ratings by these customers for the same or similar issues (as the calling issue) and recommend an agent based on availability to handle the current calling customer interaction.

The method ends and returns the recommended agent to the process of FIG. 2 Block 270.

Returning to decision block 615, if the calling customer has a customer profile in the customer profile data (customer cold start=NO), the algorithm goes to decision block 640 to decide whether this is an agent cold start situation (similar to decision block 520 FIG. 5 and block 620 FIG. 6).

In response to having information that one or more agents previously interacted with the calling customer (agent cold start=NO), the algorithm moves to block 645. At block 645, the algorithm selects (from the rankings of ratings) the highest rated agent by this customer based on the agent's current availability. For example, from all the agents that previously interacted with this calling customer and were previously rated by this calling customer (which is found from the event data), the highest rated agent is selected as the recommended agent who is currently available.

The method ends and returns the recommended agent to the process of FIG. 2 Block 270.

Returning to decision block 640 (agent cold start?), if the system determines the calling customer has had no previous interactions with any specific agent (similar to block 620), then Agent Cold Start=YES and the flow moves to block 650.

At block 650, the algorithm identifies agents (from the agent data) that are similar to agents that the current customer has rated highly. These are identified from the previously generated inverted ranking of ratings at block 610 and based on agent characteristics from the agent data.

At block 660, the algorithm recommends the agent with a similar skill set based on the agent's current availability.

The method ends and returns the recommended agent to the process of FIG. 2 Block 270. Thereafter, the system may establish a communication channel between a device associated with the recommended agent and the customer interaction to route the customer interaction to the recommended agent as described with reference to FIG. 2 block 280.

With the present routing system 100 and its adaptive next best agent algorithm, the hierarchical nature of all the decisions and data improves the previous technical static processes of agent identification and routing. The present implementation ensures that the richness of data is exploited at every stage of the calculations. As described herein, the present algorithm is implemented to start at the highest level of data and looks at the amount of customer data that is available, the amount of agent data that is available, and the amount of product and issue information that is available in the system.

In one embodiment, the routing system 100 simultaneously and ultimately is optimizing for each level of available data (e.g., the combination of data available). Thus, the hierarchical nature of the adaptive recommendation algorithms is unique and advantageous over prior non-adaptive, non-hierarchical techniques that do not consider what combination of data is available. The present system is configured to optimize the process for identifying and converging on the next best agent faster than previous techniques by performing the present hierarchical data analysis.

Machine Learning (ML) Model Embodiment

In one embodiment, the next-best-agent (NBA) model 135 from FIG. 1 and/or block 270 from FIG. 2 may be implemented with an ML model to generate the recommended agent. For example, the ML model may be implemented with a single model or with an ensemble of ML models as described below. The different levels of hierarchical data that are collected and obtained from any of the plurality of routing algorithms may be input to the machine learning (ML) model to generate the recommended agent in block 270.

In one embodiment, the ML model is a similarity model configured to measure the similarity or closeness between different items or data points received from the executed routing algorithm. Input data to the ML model is represented in a suitable format for the model. This may involve converting and transforming the collected data into numerical vectors using techniques like word embeddings or transforming values or data strings into feature vectors using methods like convolutional neural networks (CNNs). This transforming process may be performed by the data transformation module 130 (FIG. 1).

The ML model may then extract relevant features from the input data that capture selected relevant characteristics.

These features should be informative and discriminative, allowing the model to differentiate between different items.

A similarity metric may be defined to quantify the similarity between two data points. This metric depends on the specific problem and data type. For example, in text data, cosine similarity or Euclidean distance could be used.

The ML model may be trained using a suitable learning algorithm. The training data typically includes pairs of items with known similarity labels, for example, recommended agents to a set of conditions. The model learns to optimize its parameters based on these labeled pairs, minimizing the difference between predicted similarities and true similarities.

Once the model is trained, it can be used to predict the similarity between new pairs of items that were not seen during training. These new pairs of items are obtained from the executed routing algorithms based on the available data in the unified data source. The model takes the representations of the two items as input, applies the learned transformations, and calculates the similarity score using the defined metric. The ML model may then rank the pairs in terms of similarity to identify the recommended agent.

In another embodiment, an ensemble of machine learning (ML) models is used for making the final recommendations of the best agent. The ML models may include, but not limited to, a recommender model based on a problem statement per customer per issue, and a clustering model approach for grouping similar problems together and picking the best agent who has success with most of the problem resolutions. Each ML model in the ensemble may be configured to select and recommend a next best agent that it predicts is best suited for the calling customer. The output from each ML model may be a list of recommended best agents. The output from each ML model may then be combined using a statistical function, for example voting or averaging the recommendations, to obtain the final recommended best agent.

Cloud or Enterprise Embodiments

In one embodiment, the routing system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the routing system 100 is a centralized server-side application that provides at least the functions disclosed herein and that is accessed by many users via computing devices/terminals communicating with the computing system of the routing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 7:
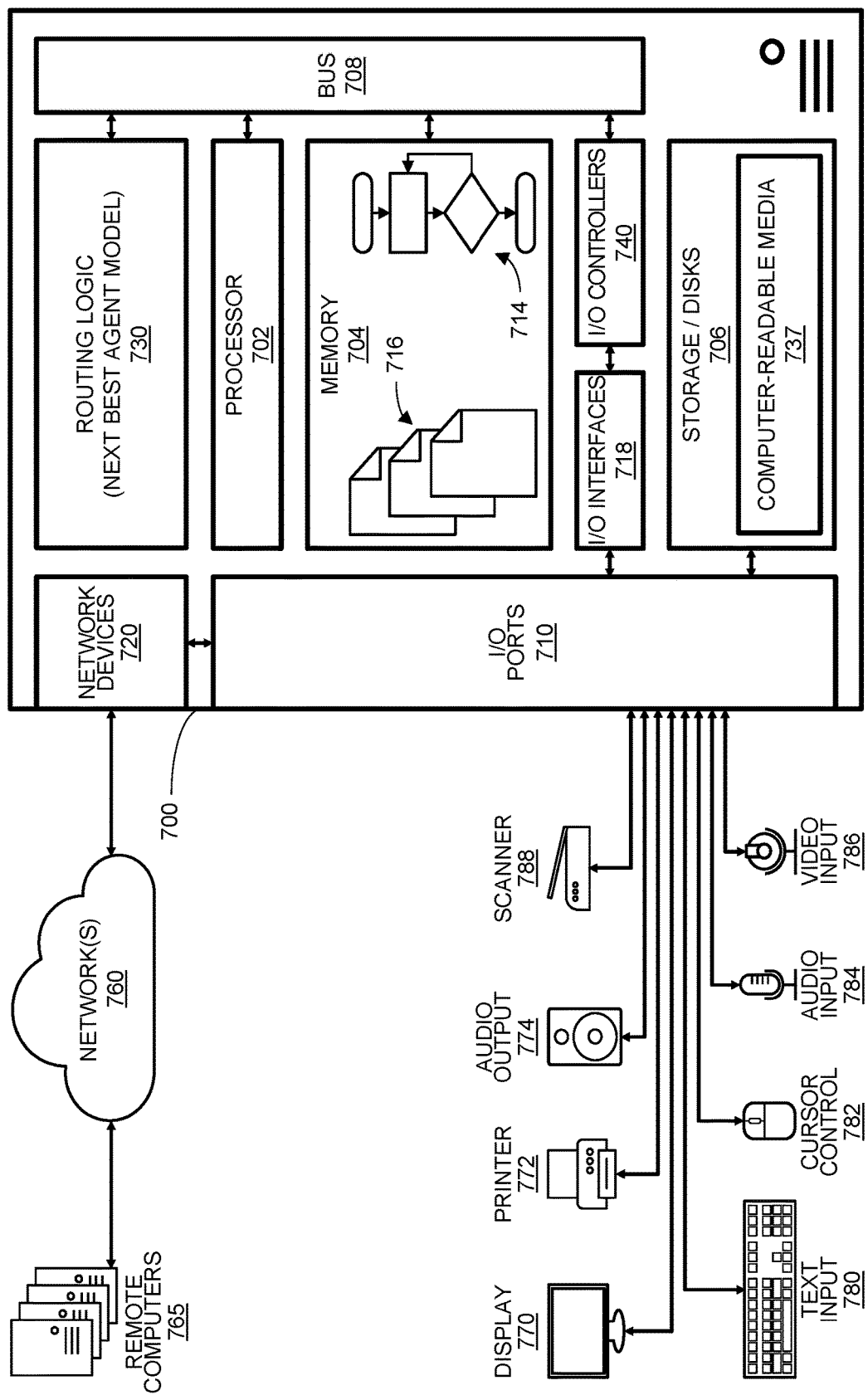
FIG. 7 illustrates an embodiment of a computing system configured with the example systems and/or methods disclosed.

FIG. 7 illustrates an example computing device that is configured and/or programmed as a special purpose computing device with one or more of the example systems and methods described herein, and/or equivalents. The example computing device may be a computer 700 that includes at least one hardware processor 702, a memory 704, and input/output ports 710 operably connected by a bus 708. In one example, the computer 700 may include routing logic 730 configured to facilitate a next best agent recommendation model similar to routing system 100 and its corresponding algorithms shown in FIGS. 1-6.

In different examples, the logic 730 may be implemented in hardware, a non-transitory computer-readable medium 737 with stored instructions, firmware, and/or combinations thereof. While the logic 730 is illustrated as a hardware component attached to the bus 708, it is to be appreciated that in other embodiments, the logic 730 could be implemented in the processor 702, stored in memory 704, or stored in disk 706.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the routing system 100. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing one or more of the disclosed functions and/or combinations of the functions.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710 that are controlled by at least an input/output (I/O) controller 740. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with, control, and/or be controlled by input/output (I/O) devices via the input/output (I/O) controller 740, the I/O interfaces 718, and the input/output ports 710. Input/output devices may include, for example, one or more displays 770, printers 772 (such as inkjet, laser, or 3D printers), audio output devices 774 (such as speakers or headphones), text input devices 780 (such as keyboards), cursor control devices 782 for pointing and selection inputs (such as mice, trackballs, touch screens, joysticks, pointing sticks, electronic styluses, electronic pen tablets), audio input devices 784 (such as microphones or external audio players), video input devices 786 (such as video and still cameras, or external video players), image scanners 788, video cards (not shown), disks 706, network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network 760. Through the network, the computer 700 may be logically connected to remote computers 765. Networks with which the computer 700 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system for an organization, the computing system comprising:
   at least one processor connected to at least one memory;
   an integrated data system that contains at least three categories of data comprising (1) customer event data from a first database, (2) customer profile data from a second database and (3) agent data from a third database to create a unified data source;
   wherein the customer event data includes at least data records representing historical interactions between the organization and a plurality of customers, wherein each customer is assigned a customer ID;
   wherein the customer profile data includes at least data records representing a customer profile associated with a customer ID that tracks a plurality of parameters including the customer ID, a customer name, and a customer type;
   wherein the agent data includes, for each agent from a plurality of agents, data records representing experience levels in subjects, skill levels, and interactions involving particular issues with particular customer IDs;
   a non-transitory computer readable medium including instructions stored thereon that implement a routing module that when executed by at least the processor cause the processor to recommend a next best agent for a customer interaction by:
      in response to receiving a customer interaction associated with an issue and a customer ID, querying the unified data source to identify which of the at least three categories of data are available that are associated with the issue and the customer ID;
      determining a combination of available data from the at least three categories of data based on results of the querying;
      based on the combination of available data, selecting and executing a routing algorithm from a plurality of routing algorithms that is configured to generate a recommended agent from the plurality of agents for the customer interaction based on the combination of available data;
      wherein each different routing algorithm from the plurality of routing algorithms is configured based on a different combination of the at least three categories of data;
      generating, by the executed routing algorithm, an agent recommendation from the plurality of agents for the customer interaction; and
      establishing a communication channel between a device associated with the recommended agent and the customer interaction to route the customer interaction to the recommended agent.

2. The computing system of claim 1,
   wherein the customer event data further includes at least data records representing historical customer engagement in campaigns with the organization over a time period and a level of involvement, wherein the data records of the customer event data are identified by at least the customer ID for each of the plurality of customers.

3. The computing system of claim 1, wherein the routing module is configured with the plurality of routing algorithms based on the combination of available data; and
   wherein the plurality of routing algorithms includes different routing algorithms configured as a different hierarchical algorithm that uses the combination of available data in different hierarchical levels based on the combination of available data that is present from the results of the querying.

4. The computing system of claim 1, wherein the routing module is configured with the plurality of routing algorithms including:
   a first routing algorithm configured to generate the agent recommendation based on the customer event data being available and not considering the customer profile data or the agent data;
   a second routing algorithm configured to generate the agent recommendation based on a combination of the customer event data and the customer profile data being available; and
   a third routing algorithm configured to generate the agent recommendation based on a combination of the customer event data, the customer profile data, and the agent data being available.

5. The computing system of claim 1, wherein each of the at least three categories of data are stored in separate data tables in the unified data source;
   wherein the integrated data system is configured to respond to a query requesting to identify which of the at least three categories of data are available by at least:
   identifying whether each of the data tables is present in the unified data source; and
   returning a query response that indicates the combination of available data based on the identifying.

6. The computing system of claim 1, wherein each of the different routing algorithms from the plurality of routing algorithms is configured to:
   determine whether the customer interaction is received from a first-time customer or an existing customer based at least on the customer ID;

in response to being the first-time customer, generate the recommended agent based on any available agents that are rated by other customers; and in response to being the existing customer, generate the recommended agent based on available agents that were previously highly rated by the customer of the customer interaction.

7. The computing system of claim 1, in response to the combination of available data including the customer event data without other categories of data, the system is configured to select and execute the routing algorithm that is configured to:

parse and analyze the customer event data to determine whether data records include customer ratings given to incidents, agent ratings given by customers for incidents, and issue data that identifies issue types associated with previous incidents;

identify a set of agents that were involved in the incidents from the data records;

generate a ranking of ratings for each agent in the set of agents for each issue type associated with the previous incidents;

determine whether the customer ID from the customer interaction is a cold start;

in response to being a cold start, assign a highest rated agent across all customers to the customer interaction involving the same issue as in the customer interaction; and in response to being not being a cold start, assign a highest rated agent by the customer ID to the customer interaction.

8. A method implemented and performed by a computing system, the method comprising:

in response to receiving a customer interaction associated with an issue and a customer ID, querying a unified data source to identify which categories of data are available;

wherein the unified data source integrates a plurality of data categories from different data sources;

determining a combination of available data categories from the plurality of data categories that is available based on results of the querying;

based on the combination of available data categories, selecting and executing a routing algorithm from a plurality of routing algorithms;

wherein the routing algorithm selected is based on the routing algorithm being configured to generate a recommended agent from a plurality of agents for the customer interaction based on the combination of available data categories;

wherein each different routing algorithm from the plurality of routing algorithms is configured based on a different combination of the plurality of data categories;

generating, by the executed routing algorithm, an agent recommendation from the plurality of agents for the customer interaction; and establishing a communication channel between a device associated with the recommended agent and the customer interaction to route the customer interaction to the recommended agent.

9. The method of claim 8, wherein the plurality of data categories includes customer event data, customer profile data, and agent data;

wherein the customer event data includes at least data records representing historical interactions between an organization and a plurality of customers, wherein each customer is assigned a customer ID;

wherein the customer profile data includes at least data records representing a customer profile associated with a customer ID that tracks a plurality of parameters including the customer ID, a customer name, and a customer type; and wherein the agent data includes, for each agent from a plurality of agents, data records representing experience levels in subjects, skill levels, and interactions involving particular issues with particular customer IDs.

10. The method of claim 8, wherein each different routing algorithm from the plurality of routing algorithms executes a different hierarchical algorithm that uses the combination of available data categories in different hierarchical levels based on what combination of available data categories is present.

11. The method of claim 8, wherein the plurality of routing algorithms includes:

a first routing algorithm configured to generate the agent recommendation based on one category of data being available from the plurality of data categories and not considering other data categories;

a second routing algorithm configured to generate the agent recommendation based on a combination of two data categories being available from the plurality of data categories; and a third routing algorithm configured to generate the agent recommendation based on a combination of three data categories being available from the plurality of data categories.

12. The method of claim 8, further comprising:

obtaining each category of data of the plurality of data categories from a different data source;

storing each category of data in a separate data table in the unified data source;

wherein the unified data source is configured to respond to a query requesting to identify which of the data categories are available by at least:

identifying which of the data tables associated with the plurality of data categories is present in the unified data source; and returning a query response that indicates the combination of available data categories based on the identifying.

13. The method of claim 8, wherein each of the different routing algorithms from the plurality of routing algorithms is configured to:

determine whether the customer interaction is received from a first-time customer or from an existing customer based at least on the customer ID;

in response to being the first-time customer, generating the recommended agent based on any available agents that are rated by other customers; and in response to being the existing customer, generating the recommended agent based on available agents that were previously highly rated by the customer ID of the customer interaction.

14. The method of claim 8, in response to the combination of available data categories including customer event data without other categories of available data, identifying and selecting the routing algorithm from the plurality of routing algorithms that is configured to:

parse and analyze the customer event data to determine whether data records include customer ratings given to incidents, agent ratings given by customers for incidents, and issue data that identifies issue types associated with previous incidents;

identify a set of agents that were involved in the incidents from the data records;

generate a ranking of ratings for each agent in the set of agents for each issue type associated with the previous incidents based on at least a product/service context of the previous incidents;

determine whether the customer ID from the customer interaction is a cold start;

in response to being a cold start, assign a highest rated agent across all customers to the customer interaction involving the same issue as in the customer interaction; and in response to being not being a cold start, assign a highest rated agent by the customer ID to the customer interaction.

15. A non-transitory computer-readable medium that includes stored thereon computer-executable instructions that when executed by at least a processor of a computer cause the computer to:

in response to receiving, by the processor, a customer interaction associated with an issue and a customer ID, submitting a query to a unified data source to identify which categories of data are available;

wherein the unified data source integrates a plurality of data categories from different data sources;

determine, by the processor, a combination of available data categories from the plurality of data categories that is available based on results of the querying;

based on the combination of available data categories, select and execute, by the processor, a routing algorithm from a plurality of routing algorithms;

wherein the routing algorithm selected is based on the routing algorithm being configured to generate a recommended agent from a plurality of agents for the customer interaction based on the combination of available data categories;

wherein each different routing algorithm from the plurality of routing algorithms is configured based on a different combination of the plurality of data categories;

generate, by the executed routing algorithm, an agent recommendation from the plurality of agents for the customer interaction; and establish, by the processor, a communication channel between a device associated with the recommended agent and the customer interaction to route the customer interaction to the recommended agent.

16. The non-transitory computer-readable medium of claim 15, wherein the plurality of data categories includes customer event data, customer profile data, and agent data;

wherein the customer event data includes at least data records representing historical interactions between an organization and a plurality of customers, wherein each customer is assigned a customer ID;

wherein the customer profile data includes at least data records representing a customer profile associated with a customer ID that tracks a plurality of parameters including the customer ID, a customer name, and a customer type; and wherein the agent data includes, for each agent from a plurality of agents, data records representing experience levels in subjects, skill levels, and interactions involving particular issues with particular customer IDs.

17. The non-transitory computer-readable medium of claim 15, wherein each different routing algorithm from the plurality of routing algorithms executes a different hierarchical algorithm that uses the combination of available data categories in different hierarchical levels based on what combination of available data categories is present.

18. The non-transitory computer-readable medium of claim 15, further comprising instructions that configure each of the plurality of routing algorithms includes as:

a first routing algorithm configured to generate the agent recommendation based on one category of data being available from the plurality of data categories and not considering other data categories;

a second routing algorithm configured to generate the agent recommendation based on a combination of two data categories being available from the plurality of data categories; and a third routing algorithm configured to generate the agent recommendation based on a combination of three data categories being available from the plurality of data categories.

19. The non-transitory computer-readable medium of claim 15, further comprising instructions that when executed by at least the processor cause the processor to:

obtain each category of data of the plurality of data categories from a different data source;

store each category of data in a separate data table in the unified data source;

wherein the unified data source responds to the query requesting to identify which of the data categories are available by at least:

identifying which of the data tables associated with the plurality of data categories is present in the unified data source; and returning a query response that indicates the combination of available data categories based on the identifying.

20. The non-transitory computer-readable medium of claim 15, further comprising instructions that configure each of the different routing algorithms from the plurality of routing algorithms to:

determine whether the customer interaction is received from a first-time customer or from an existing customer based at least on the customer ID;

in response to being the first-time customer, generate the recommended agent based on any available agents that are rated by other customers; and in response to being the existing customer, generate the recommended agent based on available agents that were previously highly rated by the customer ID of the customer interaction.

* * * * *

UNITED STATES PATENT AND TRADEMARK OFFICE
CERTIFICATE OF CORRECTION

PATENT NO. : 12,375,608 B2
APPLICATION NO. : 18/224851
DATED : July 29, 2025
INVENTOR(S) : Katageri et al.

Page 1 of 1

It is certified that error appears in the above-identified patent and that said Letters Patent is hereby corrected as shown below:

On the Title Page

Column 2, under item (74) Attorney, Agent, or Firm, Line 1, delete "Kragulijac" and insert -- Kraguljac --, therefor.

On page 2, Column 2, under item (56) Other Publications, Line 35, delete "center," and insert -- center; --, therefor.

In the Drawings

On sheet 1 of 7, in FIG. 1, and on the title page, the illustrative print figure, Line 1, delete "Capitol" and insert -- Capital --, therefor.

In the Specification

In Column 3, Line 25, delete "APls" and insert -- APIs --, therefor.

Signed and Sealed this
Sixteenth Day of December, 2025

John A. Squires
*Director of the United States Patent and Trademark Office*